United States Patent Office 3,520,695
Patented July 14, 1970

3,520,695
INSTANT OAT CEREAL PRODUCT AND PREPARATION THEREOF
William F. Hanser, Cedar Rapids, and Lanny J. Martin, Alburnett, Iowa, assignors, by mesne assignments, to National Oats Company, Inc., a corporation of Delaware
No Drawing. Filed Aug. 7, 1967, Ser. No. 658,636
Int. Cl. A23l 1/10
U.S. Cl. 99—83                                                 6 Claims

ABSTRACT OF THE DISCLOSURE

Oat cereal of the instant oatmeal type, which upon the addition of boiling water attains the texture and true flavor of cooked oatmeal, is prepared by employing, in addition to the usual steaming of oat bits, a tempering of the oat bits in a steam atmosphere to bring the oat bits and flakes formed therefrom to the threshold of rupture, and adding to the flakes a slow-coating starch which allows the flakes to gelatinize upon the application of boiling water, and then coating the flakes to give oatmeal of uniform texture having the true flavor of cooked oatmeal.

SUMMARY

Instant oatmeal, which can be prepared by simply adding boiling water to the flakes, has been sought for many years. In one operation, the oats in their hulls are toasted to provide a flavor which masks the raw oat flavor, and thereafter the groats are treated in an extensive series of steps. It has also been suggested that gums be added to oat flakes so that when hot water is applied, the gums will coat the raw flakes and mask the raw flavor of the product.

We have discovered that an oatmeal product of uniform texture can be prepared upon the application of boiling water to give the true flavor of cooked oatmeal without the addition of a masking material, while at the same time providing flakes with a coating which renders them uniform in flavor and texture.

To oat flakes which have been treated to bring them to a point of incipient gelatinization, we add an edible polysaccharide starch which is slow coating in character so that the oat material which hydrates rapidly is largely gelatinized before coating with starch. The slow-coating starches include potato starch, tapioca starch, wheat starch, corn starch, waxy maize starch, arrowroot starch, and the like. The starches are soluble in water, swelling in contact with water to form colloidal solutions which coat the oak flakes which have hydrated rapidly with the initial application of boiling water.

The process may be practiced with quick oats which are prepared generally in the trade by steel-cutting the dehulled groats, softening the groats with steam, and then flaking with steel rolls. The process may also be employed effectively with a much finer product known as baby oats, this product being prepared by sieving the oat bits to obtain a finer oat bit product.

DETAILED DESCRIPTION

The preparation of quick cooking rolled oats and baby oats is well known. In the processes, the rolled oats are prepared by dehulling oats, steel-cutting the resulting groats, and, after the groats are softened with steam, flaking the groats to prepare fractional portions of the whole groat, these fractions or segments being generally called "oat bits." As earlier stated, the larger oat bits, after rolling, are generally described as "quick oats," while the flakes formed from finer fragments are generally described as "baby oats."

In the steaming of the quick oats or baby oats, it is common practice to pass the oat bits downwardly through a long vessel which tapers laterally and at its bottom has side walls which are inclined inwardly over a control roller having grooves which feed the oat bits downwardly between flaking rollers. The oat bits are fed so as to keep the steamer vessel filled. Steam pipes extend downwardly through the vessel and have openings near the central portion of the vessel so that steam is brought in contact with the oat bits as they move downwardly through the vessel. Ordinarily, the oats are steamed in the vessel for about 8 to 10 minutes to inactivate the lipase and tryosinase while also softening the oat bits for rolling. After flaking, the product is the known product of quick oats or baby oats depending on the degree of fineness of the flakes.

We have discovered that the addition of slow-coating starch to oat flakes, which are already near the point of rupturing, permits the boiling water to accomplish its purpose in completing substantially the gelatinization of the flakes, while then coating the flakes so as to make the texture uniform and to give the true flavor of cooked oatmeal. Starches such as potato starch, tapioca starch, wheat starch, corn starch, waxy maize starch, and other starch are found to be slow coating during the boiling water treatment, and this enables the oat flakes to be effectively cooked, in effect, by being largely gelatinized, while the starch coating then provides uniformity in the product and gives an additional soft, pudding-like texture to the porridge.

The amount of starch added to the oat flakes may vary from 0.5–15 percent, but we prefer to use between 2–5 percent. The starch in commercially available powdered form may be simply dry mixed with the rolled oats. If desired, it may be dispersed or dissolved in water and applied to the rolled oats by spraying or other means. A mixture of the starches may be employed instead of a single starch since a given weight of two or more starches is generally equivalent to the same weight of a single starch.

Under our process, the oat bits after they have been subjected to the steaming operation described above are then subjected to a tempering step for an additional period of time (preferably about 8 to 10 minutes) in the presence of steam. The tempering operation may be carried out in a separate vessel after the oat bits leave the vessel described above, or it may be carried out in the steam vessel by elongating the vessel or otherwise providing a substantial tempering area below the point where the steam is distributed into the body of oat bits and until the bits leave the feed control roller at the bottom of the treating vessel.

The above additional step of tempering the oat bits results in rupturing about 12–30 percent of the oat bits while bringing about 75–90 percent of the remaining oat bits to the threshold of rupturing.

While in the old practice, about 5–7 percent of the oat bits were ruptured, we now find that about 12–30 percent of the oat bits are ruptured, and this greater amount does not interfere with the rolling operation because of the dominating effect of the 70–88 percent in unruptured oat bits.

The product produced by our process is quite different in appearance and structure from the product prepared without the tempering step. The oat bits prepared under the old practice without the tempering step have a glossy appearance and tend to adhere to each other. The glossy appearance is probably due to a surface water content. After the tempering operation, the oat bits have a dull appearance and no longer tend to adhere to each other. We believe that the tempering period causes the moisture on the surface of the bits to enter into the oat bits, and this causes the final flaked product to respond more readily to the boiling water so as to attain the true flavor of cooked oatmeal.

The time and temperature conditions of our process will vary with the physical conditions of the oats being processed, but the operator can readily observe the oat bits as they fall from the steamer onto the flaking rolls and can make sure that the bits are free-flowing and have lost their glossy appearance and have a dull appearance due to driving the surface moisture into the interior of the bits. Under these conditions, about 12-20 percent of the oat bits will have ruptured starch cells. To attain this result, generally the treatment should be in the range of about 220-250° F. and for about 16-20 minutes.

Specific examples which are illustrative of the process may be set out as follows:

EXAMPLE I

Steel-cut groats were passed through a sifter to obtain oat bits No. 2 which are generally referred to as baby oats. The oat bits were passed through an elongated steamer and subjected to steam therein for a period of 18 minutes maintained at a temperature of about 225° F. In the operation, it was found that 15 percent of the oat bits were maintained above the steam coils, while about 20 percent of the oat bits were in the middle area where the steam was emitted from the coils. Below the coils, there was a tempering zone in which 65 percent of the oat bits were retained at about the same temperature. The bits were fed between flaking rolls to from flakes. Three percent of salt was added to the flakes.

Four parts of potato starch were then mixed with 96 parts by weight of the flakes. The resulting product was placed in a bowl, boiling water added, and stirred to provide a porridge. On testing, it was found that the porridge had the true taste of cooked oatmeal.

EXAMPLE II

The product was prepared as described in Example I, using fine bits which are usually referred to as baby bits, and the treating period was for 15 minutes at a temperature of about 245° F. It was found that the bits lost their glossy appearance and that the surface moisture went into the body of the bits to give them a dull appearance. The bits were then rolled to form flakes.

Four parts by weight of corn starch were dry mixed with 96 parts of the flakes. Upon testing, comparable results were obtained to those described in Example I.

EXAMPLE III

The process was carried out as described in Example I, except that tapioca starch was substituted for potato starch and 5 percent of the starch was used instead of 4 percent.

EXAMPLE IV

The process was carried out as in Example I except that quick oats having a larger particle size than the oat bits described in Example II were employed. After the customary heating of the oat bits for about 8 minutes in contact with steam from the coils, the oat bits were maintained for a retention time of about 9 minutes in the zone below the steam coils, resulting in the rupturing of about 15 percent of the cells of the oat bits.

The oat bits were rolled and 95 percent of the oats were mixed with 5 percent by weight of dry wheat starch. Upon testing, as described in Example I, a product comparable to that of Example I was obtained.

EXAMPLE V

The process was carried out as described in Example I except that four parts of waxy maize were dry mixed with 96 parts of the oat flakes. 24-32 grams of the product were placed in a cereal bowl and about ¾ cup of boiling water placed over the product and stirred until blended. Upon adding cream and sugar, it was found that the product had the true taste of cooked oatmeal.

EXAMPLE VI

The process was carried out as described in Example I except that 3 parts of waxy maize starch were dry mixed with 97 parts of the rolled oats. The application of boiling water together with stirring gave a porridge having the true taste of cooked oatmeal.

While in the foregoing specification we have set out specific modes of operation in considerable detail for the purpose of illustrating the invention, it will be understood that such details of procedure may be varied widely by those skilled in the art without departing from the spirit of our invention.

We claim:

1. An instant-type oat flake product which upon the addition of boiling water and stirring attains the texture and flavor of cooked oatmeal, comprising essentially steamed oat flakes, of which about 12-30 percent have their starch cells ruptured, and 0.5-15 percent by weight of a polysaccharide starch which hydrates relatively slowly and after substantial gelatinization of said steamed oat flakes.

2. The product of claim 1 in which said starch constitutes about 2-5 percent by weight.

3. A product according to claim 1 in which said starch is potato starch.

4. In a process for the preparation of an instant-type oat flake product which upon the addition of boiling water and stirring attains the texture and true flavor of cooked oatmeal, the steps of steaming oat bits and tempering the same in the presence of steam to bring the percent of bits having ruptured cells to about 12-20 percent, rolling the bits to form flakes, and mixing the flakes with 0.5-15 percent of a polysaccharide starch.

5. The process of claim 4 in which the starch is selected from a group consisting of potato starch, tapioca starch, wheat starch, corn starch, waxy maize starch, and arrowroot starch.

6. The process of claim 4 in which the starch is 2-5 percent by weight.

References Cited

UNITED STATES PATENTS

| | | | |
|---|---|---|---|
| 2,890,117 | 6/1959 | Cantor et al. | 99—83 |
| 2,890,118 | 6/1959 | Cantor et al. | 99—83 |
| 2,999,018 | 9/1961 | Huffman et al. | 99—83 |

LIONEL M. SHAPIRO, Primary Examiner

J. R. HOFFMAN, Assistant Examiner

U.S. Cl. X.R.

99—80